United States Patent [19]

Voth

[11] Patent Number: 5,581,669
[45] Date of Patent: Dec. 3, 1996

[54] SYSTEM AND METHOD FOR PERIPHERAL DATA TRANSFER

[75] Inventor: David W. Voth, Redmond, Wash.

[73] Assignee: Microsoft Corporation, Redmond, Wash.

[21] Appl. No.: 161,785

[22] Filed: Dec. 3, 1993

Related U.S. Application Data

[63] Continuation-in-part of Ser. No. 992,703, Dec. 18, 1992, Pat. No. 5,461,701.

[51] Int. Cl.⁶ .................................................. G06F 15/00
[52] U.S. Cl. ............................................................. 395/113
[58] Field of Search .................................... 395/113, 114, 395/115, 101, 111, 112, 110; 369/910

[56] References Cited

U.S. PATENT DOCUMENTS

| | | | |
|---|---|---|---|
| 4,754,428 | 6/1988 | Schultz et al. | 364/900 |
| 4,868,653 | 9/1989 | Golin et al. | 358/133 |
| 4,918,523 | 4/1990 | Simon et al. | 358/133 |
| 5,029,124 | 7/1991 | Leahy et al. | 364/900 |
| 5,268,993 | 12/1993 | Ikenoue et al. | 395/114 |

FOREIGN PATENT DOCUMENTS

WO93/23812  11/1993  WIPO ............................ G06F 13/38

OTHER PUBLICATIONS

IBM Technical Disclosure Bulletin, 26:5783–5784, 1984.
IBM Technical Disclosure Bulletin, 33:88–89, 1990.

*Primary Examiner*—Raymond J. Bayerl
*Assistant Examiner*—Steven P. Sax
*Attorney, Agent, or Firm*—Seed and Berry LLP

[57] ABSTRACT

A system and method for increasing the rate of data transfer from a host computer to a peripheral such as a printer without the need for special hardware within the host computer or a special interface cable coupling the host computer to the peripheral. Data is transferred from the host computer to the peripheral in 4 Kbyte bursts. Handshaking occurs between the host computer and the peripheral only between bursts. Bytes of peripheral data are apportioned into multiple bytes of data within the host computer. The multiple bytes are transmitted from the host computer to the peripheral, each transmitted byte containing a data clock and several bits of peripheral data. In one embodiment, the peripheral data byte is apportioned into two bytes within the host computer with each byte having a pair of clock signals transmitted along with the peripheral data portion. In another embodiment, three bytes of peripheral data are apportioned into four bytes within the host computer with each byte having a single clock signal transmitted along with the peripheral data portion. Within the peripheral, a clock circuit detects the clock signal from each transmitted byte and generates a delayed signal to latch peripheral data bytes into a storage register. In addition, the first transmitted byte contains a flag to signal the peripheral that the data that follows is RLE compressed data. Parity bits are also included in the transmitted data. The system can be easily implemented on any Centronics compatible printer system to increase the rate of data transfer.

33 Claims, 11 Drawing Sheets

SYSTEM AND METHOD FOR PERIPHERAL DATA TRANSFER

CROSS-REFERENCE TO RELATED APPLICATIONS

This application is a continuation-in-part of U.S. patent application, Ser. No. 992,703, filed Dec. 18, 1992, now issued as U.S. Pat. No. 5,461,701.

TECHNICAL FIELD

The present invention is related generally to the transfer of data to a peripheral, and more specifically, to a system and method for improving the data transfer rate between a host computer and a peripheral.

BACKGROUND OF THE INVENTION

Numerous computers and printers have been developed for home and office use. Occasionally, a de facto standard for hardware evolves by virtue of one company being the first to develop a particular piece of hardware. For example, the interface hardware for printers connected to a host computer evolved around what is commonly called the Centronics Printer Port. This is a data I/O port on the host computer for connecting a printer to the host computer via parallel printer interface cable. Computer manufacturers and printer manufacturers provided "Centtonics Compatible" printer interfaces, making it the de facto standard for host computer-printer interfaces.

The Centronics Compatible standard has been adopted by the Institute for Electrical and Electronic Engineers (IEEE) as part of the P1284 standard for "Standard Signaling Method for a Bidirectional Parallel Peripheral Interface for Personal Computers." While IEEE P1284 describes a bidirectional signaling method for two way communication between the printer and the host computer, the Centronics Compatible standard is adopted as the "Compatible Mode" for data transfers from the host computer to the printer.

Unlike modern printers, which typically contain microprocessors and memory, early printers typically had little or no computing power. These so called "dumb" printers are still frequently used today. Data is transferred from the host computer to the printer, one byte at a time, and stored in a data register such as a first-in first-out (FIFO) buffer. The printer receives printer data from the host computer via a computer interface cable. The printer data must be transferred from the host computer to the printer in the sequence in which the data will be printed. Typically, the data transferred from the host computer to the printer is data representing alphanumeric characters. The most common code for this type of data transfer is the American Standard Code for Information Interchange (ASCII) data bytes corresponding to the characters, which uses eight bit data bytes to represent various alphanumeric characters.

In an example illustrated in FIG. 1, a printer 10 will begin printing alphanumeric characters starting at the upper left-hand corner of a printed page 12. The ASCII character data bytes corresponding to the phrase "This is a test." are transferred from a host computer 16 to the printer 10 in the exact sequence in which the characters are to be printed on the printed page 12. If the user wishes to print the message in a different location on the printed page 12, the host computer 16 will transfer to the printer 10 a series of ASCII character data bytes corresponding to line feed characters, tabs, spaces, and the like. Thus, the printer 10 only receives the data and prints the data, and does not perform any data processing such as calculating positions for graphics data or plotting lines as may be done with more sophisticated printers such as a laser printer.

An I/O interface 14 within the host computer 16 controls the transfer of data from the host computer to the printer 10. The I/O interface 14 first checks the status of the printer 10 to make sure that the printer is ready to receive data from the host computer 16. A status line 17 within a printer interface 18 indicates the current status of the printer 10. A central processor unit (CPU) 22 within the host computer 16 transfers a byte of data to the I/O interface 14 from a memory 24 or other suitable storage location. The CPU 22 is coupled to the memory 24 and the I/O interface 14 by a bus 26 that carries data and control signals. After a delay, caused by propagation of the data on an interface cable 28 from the I/O interface 14 to the printer interface 18, the byte of data appears at the inputs to the printer interface 18. The I/O interface 14 waits a predetermined period of time to allow the data lines to settle at the inputs of the printer interface 18 and then asserts a control line to transfer the data to the printer 10. The printer interface 18 changes the logic state of the status line 17 to indicate that the printer 10 is busy and cannot accept additional data. The printer 10 processes the received data in a well-known manner that will not be described herein. When ready for the next data byte, the printer 10 changes the logic state of the status line 17 to indicate to the host computer 16 that the next byte of data can be transferred to the printer. This process is repeated for every data byte transferred from the host computer 16 to the printer 10.

FIG. 2 illustrates the typical timing waveforms for a data I/O transfer using the Centtonics Compatible standard. As discussed above, the I/O interface 14 must first check the status of the printer 10. The status line 17, which is typically called the BUSY status line within the printer 10 indicates the current status of the printer. If the BUSY line is at a logic high level, the printer 10 is busy and cannot accept data. If the printer can accept data, the BUSY line is at a logic low level. Note that the terms "high" and "low" refer to the high logic level and the low logic level, respectively.

Data is transferred from the host computer 16 to the printer 10 on the falling edge of a STROBE control line as it goes low. This is sometimes referred to as "asserting" the STROBE line. The term "assert" refers to making a signal logically true, regardless of whether the signal is active high or low. Conversely, the term "deasserting" refers to making a signal line logically false, regardless of whether the signal is active high or low.

When the I/O interface 14 in the host computer 16 transfers the data, there will be a period of time during which the data signals are propagating down the interface cable 28 from the host computer 16 to the printer 10. In addition, some hardware, such as data registers or latches (not shown) within the printer interface 18, require that the data lines be settled for a period of time before the clock changes states to enter the data. This time, typically called a data setup time, may be as high as 50 nanoseconds. A typical I/O interface 14 may not assert the STROBE line for several microseconds after the data has been transferred to allow for propagation delay and data setup requirements. Under the IEEE P1284 standard for the Compatible Mode, the data lines must be settled in a logic high or low level for at least 500 nanoseconds before the STROBE line goes low, as indicated by the reference letter A in FIG. 2. The STROBE line must stay low for at least 500 nanoseconds, as indicated by the reference letter B, however older Centronics Compatible interfaces may keep the STROBE line low for as long as 5 microseconds. Under IEEE P1284, the data must remain stable for at least 500 nanoseconds after the STROBE line returns high, as indicated by the reference letter C in FIG. 2.

The BUSY line in the printer changes states from a low logic level to a high logic level in response to the assertion of the STROBE line. Under IEEE P1284, the BUSY line must go high within 500 nanoseconds of the STROBE line going low, as indicated by the reference letter D, and must remain high for at least 500 nanoseconds, as indicated by the reference letter E. Note that there is no maximum time specified for the BUSY line to be high. This is due to the fact that printer activities cannot be predicted. For example, if the buffer (not shown) in which the data is stored in the printer becomes full, the BUSY line may remain high for an indeterminate period of time. Similarly, if the printer 10 has an error such as a paper jam, the BUSY line will remain high.

In addition to the BUSY line, another status line, ACK, indicates that the printer 10 has received the data. The ACK line goes low after the BUSY line goes high and must remain low for at least 500 nanoseconds, as indicated by the reference letter F. The BUSY line returns low no sooner than the setting of the ACK line to a high level, as indicated by the reference letter G. When the BUSY line returns low, the next transfer cycle may begin immediately This entire cycle is repeated for each data byte transferred from the host computer 16 to the printer 10.

As can readily be seen from the illustration of FIG. 2, the transfer of a single byte of data takes several clock cycles of the computer clock. The IEEE P1284 Compatible Mode interface must perform this same sequence for each byte of data transferred to the printer. If one assumes an I/O transfer cycle of 1.0 megabytes/second, then the maximum data transfer rate for the IEEE P1284 Compatible Mode printer interface is 200 Kbytes/second. This data transfer rate is slow when one considers that the host computer may not be able to perform other tasks while the document is being printed.

Therefore, it can be appreciated that there is a significant need for an system and method of improving the data transfer rate from a host computer to a printer without the need for hardware changes within the host computer or a special printer cable.

SUMMARY OF THE INVENTION

The invention is embodied in a system that generates a plurality of output data bytes, with each of the output data bytes having first and second portions. The first portion of each of the output data bytes contains a portion of a plurality of bytes of peripheral data, and the second portion of each of the output data bytes contains a clock signal. A clock detection circuit within the peripheral detects logic transitions from the clock signals in the output data bytes and generates a delayed signal to store each of the output data bytes. The bytes of peripheral data can be restored by combining the first portions of the output data bytes.

In one embodiment, a parity bit is also transmitted in the second portion of at least one of the output data bytes. A parity checking circuit in the peripheral generates a parity error signal if a parity error occurs.

The second portion of one output data byte may also contain an indicator that the output data bytes include compressed data.

An input buffer register may be used to buffer the output data bytes.

DETAILED DESCRIPTION OF THE INVENTION

The present invention provides a system and method for increasing the speed of data transfer on an IEEE P1284 Compatible Mode computer interface. The present invention requires some additional hardware within the printer, but uses an IEEE P1284 Compatible Mode printer interface within the host computer. Furthermore, the present invention does not require a special printer cable interconnecting the printer and the host computer. While the following discussion involves printer data transfer, the inventive system and method is equally applicable to any peripheral.

Figure 1:
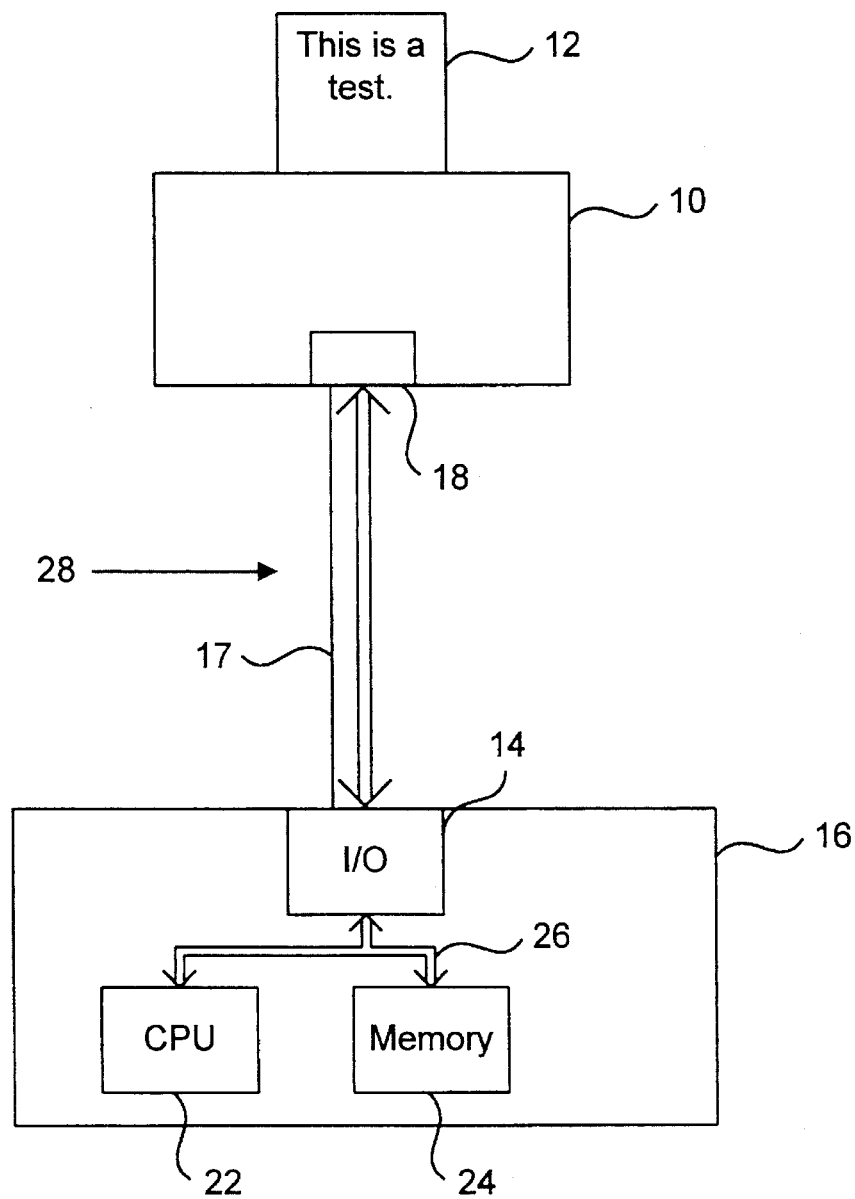
FIG. 1 is a functional block diagram of a typical prior art host computer-printer system.
Figure 2:
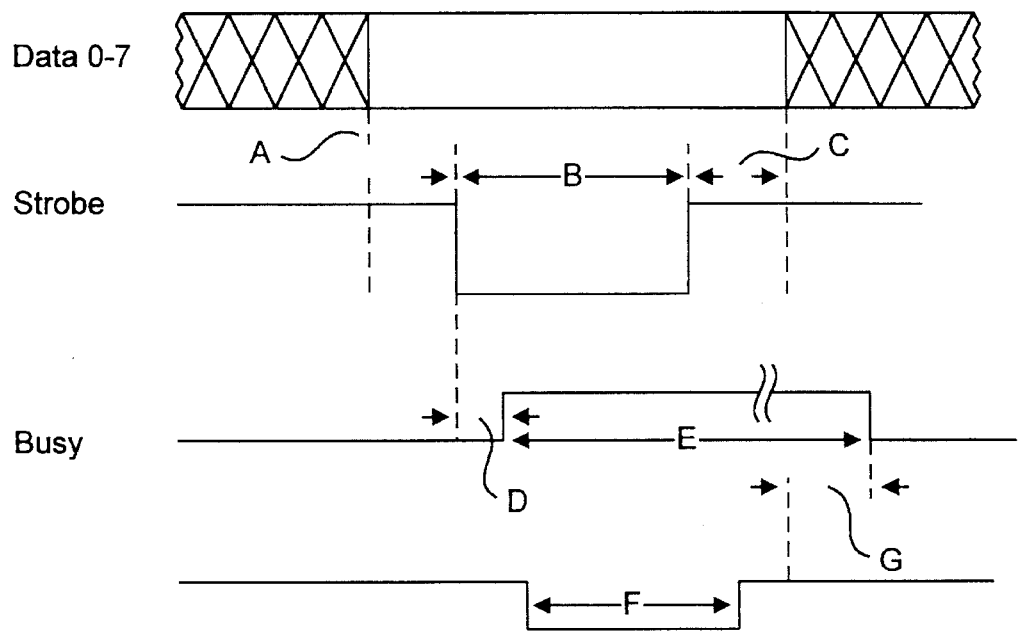
FIG. 2 is a timing diagram of a typical data I/O transfer by the prior an system of FIG. 1.
Figure 3:
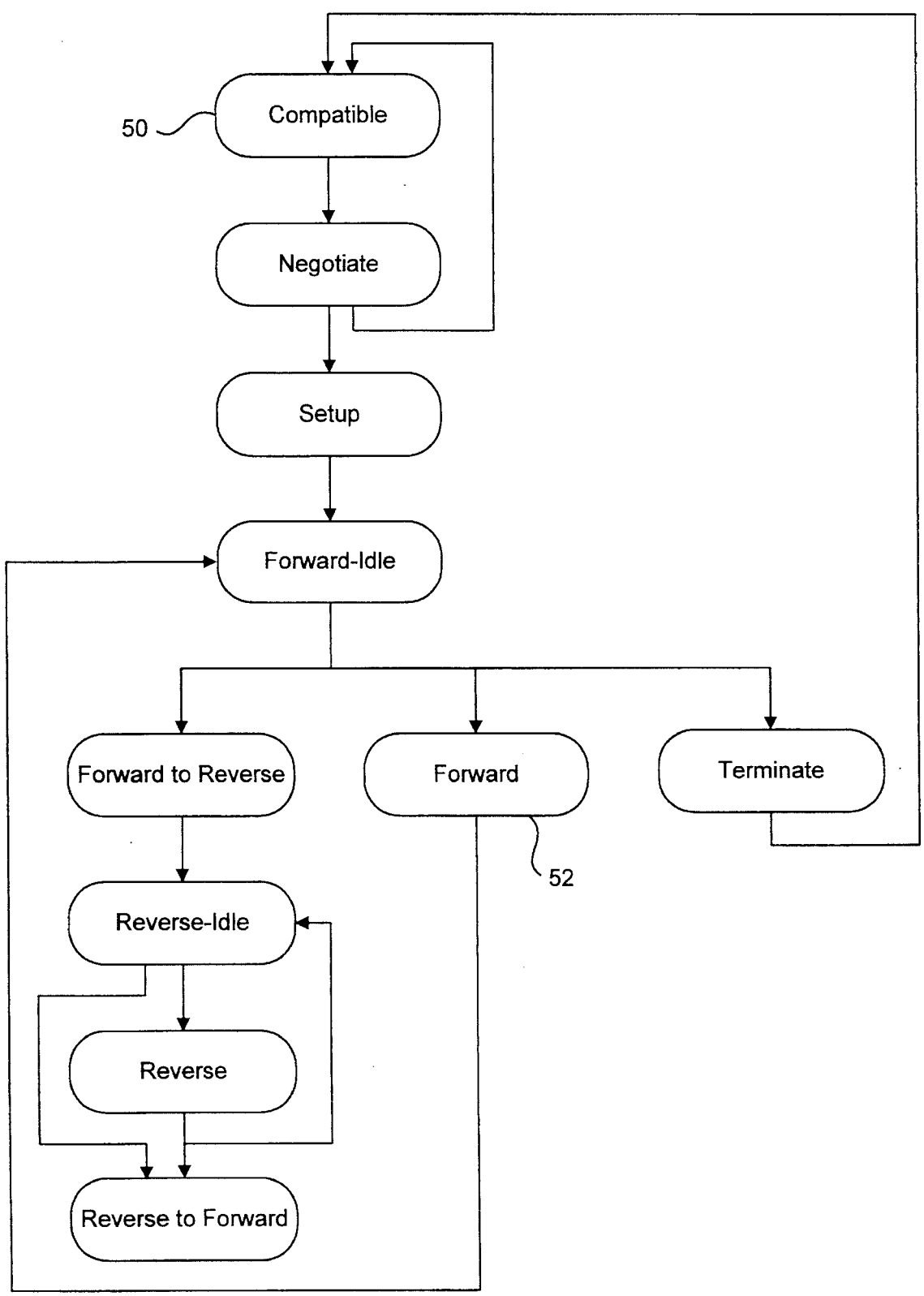
FIG. 3 is a phase transition used by the present invention.

The host computer and peripheral of the present invention operate in one of a plurality of phases or modes shown in the phase transition diagram of FIG. 3. These phases shown in FIG. 3 are defined by IEEE P1284 and will not be discussed in detail herein. The system of the present invention is initially in a compatible phase 50, which is the IEEE P1284 compatible mode well known in the prior art. The other phases are well known in the art and operate in the manner specified in the IEEE P1284 standard except for a novel data burst mode in a forward phase 52. The forward phase 52 permits the transfer of data from the host computer to the peripheral. The present invention provides the data burst mode in the forward phase 52.

Figure 4A:
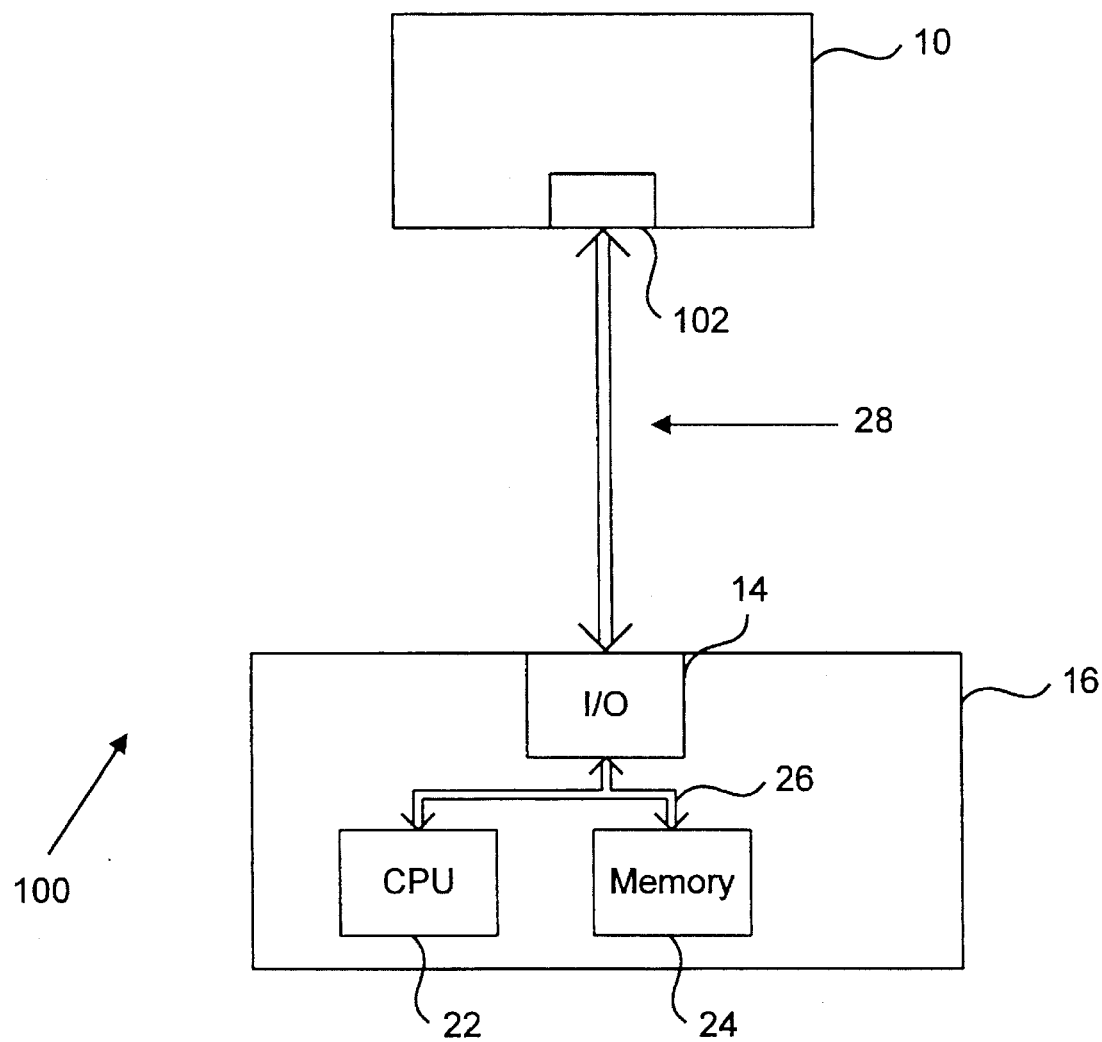
FIG. 4A is a functional block diagram of the system of the present invention.

The present invention is embodied in a system 100, shown in the functional block diagram of FIG. 4A, and includes a printer interface 102 located within the printer 10. The system 100 includes the conventional host computer 16 which does not use Direct Memory Access (DMA) mode because a DMA interface is complex and not readily available for use with a printer. Instead, the host computer 16 contains a Industry Standard Architecture (ISA) I/O interface 14, which is well known in the prior art. The I/O interface 14 is coupled to the printer interface 102 by the interface cable 28, which is a standard Centronics compatible printer cable.

Figure 4B:
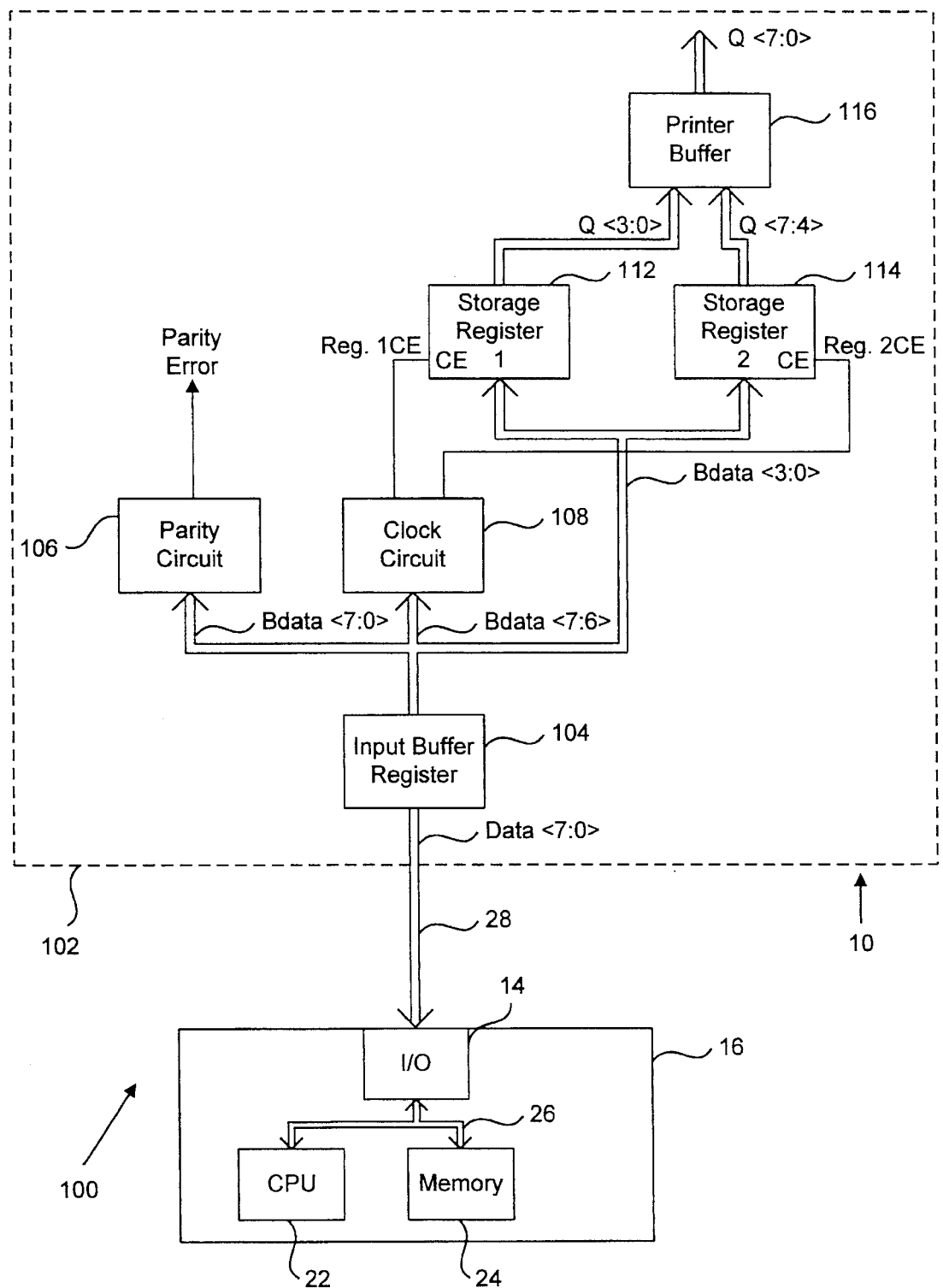
FIG. 4B is a detailed functional block diagram of one embodiment of the inventive system of FIG. 4A.

As shown in FIG. 4B, within the printer interface 102 is an input buffer register 104 which is designed to receive each transmitted byte of data from the host computer 16. The input buffer register 104 temporarily stores the received data bytes. The input buffer register 104 buffers the signals received from the data lines on the interface cable 28. Each of the sequentially received data bytes is temporarily stored within the input buffer register 104. The stored data bytes in the input buffer register 104 are coupled to a parity circuit 106, which is designed to detect a parity error. A clock circuit 108 receives two bits of each stored data byte and generates the delayed clock signals discussed above. A first storage register 112 and a second storage register 114 sequentially receive a portion of first and second stored data bytes, respectively. The outputs of the first and second storage registers 112 and 114 are simultaneously loaded into a printer buffer register 116, which may be part of the normal printer buffer, such as a FIFO buffer routinely used in the prior art. Greater details on the operation of the printer interface 102 are provided below.

Instead of transferring a byte of printer data on the falling edge of the STROBE signal, as is common in the prior art, the present invention transfers the 8 bit byte of printer data in two 4 bit nibbles in two separate data bytes Byte0 and Byte 1 transferred from the host computer 16 to the printer 10. Each of the data bytes, Byte0 and Byte 1, includes a first and second portion. The two nibbles of printer data comprise the first portion of the data bytes Byte0 and Byte 1. As will be described below, the second portion of each of the two data bytes Byte0 and Byte 1 contain other signals. Thus, the present invention allows the transfer of a byte of printer data with two I/O transfers. Each I/O transfer to the printer 10 contains not only one half of the byte of printer data, but also two clock signals, and a parity bit. In addition, one of the I/O transfers contains a flag to indicate to the printer that compressed data is being transferred. Data compression will be discussed in detail below.

The data format used is indicated in Table 1 below where the first column indicates the normal signal designation for a Centronics compatible interface. The data bits D7 to D0 in a normal I/O transfer are replaced with the signals indicated in the column for Byte0 and Byte 1. In particular, the first portion of Byte 0 contains one half of the byte of printer data, Data<3:0>, and the first portion of Byte 1 contains the other half of the byte of printer data, Data<7:4>. The second portion of Byte0 and Byte1 contains the two clock signals CLOCK and ~CLOCK, and the parity bit. Byte0 also contains the compressed data flag, RLE flag, while the corresponding bit in Byte 1 is presently undefined. The CLOCK and ~CLOCK signals become part of each byte transmitted to the printer 10. Note that the CLOCK and ~CLOCK signals have the opposite polarity and that the polarity changes from the Low Nibble to the High Nibble. This allows the printer interface 102 to distinguish the Low Nibble from the High Nibble.

TABLE 1

| Bit Assignment During Data Transfers | | |
|---|---|---|
| Centronics Signals | Value during Byte0 transfer | Value during Byte1 transfer |
| D7 | CLOCK = 1 | CLOCK = 0 |
| D6 | ~CLOCK = 0 | ~CLOCK = 1 |
| D5 | Parity bit | Parity bit |
| D4 | RLE flag | Undefined |
| D3 | Data<3> | Data<7> |

TABLE 1-continued

| Bit Assignment During Data Transfers | | |
|---|---|---|
| Centronics Signals | Value during Byte0 transfer | Value during Byte1 transfer |
| D2 | Data<2> | Data<6> |
| D1 | Data<1> | Data<5> |
| D0 | Data<0> | Data<4> |

Some problems created by the design approach of the present invention must be overcome for successful operation. First, the typical driver integrated circuit within the printer 10 has a different transition rate for a digital signal going from a high logic level to a low logic level than the transition rate for a digital signal going from a low logic level to a high logic level. In a typical Centronics Compatible interface, the high to low transitions time is approximately 50 nanoseconds, while the low to high transition rate is approximately 200 nanoseconds.

Second, the Centtonics Compatible interface is susceptible to noise problems relating to cross-talk between signal lines within the interface cable 28. The "glitches" caused by cross-talk can cause errors in the data transmission. Finally, the interface cable 28 itself introduces a propagation delay of approximately 45 nanoseconds in a 15 foot cable. The propagation delay can cause timing problems as well as simply delaying the transmission of data from the host computer 16 to the printer 10.

The present invention overcomes these problems by using two data clocks of opposite polarities, and requiring that both data clocks make a transition before the data is latched. Thus, the system of the present invention latches data on the basis on two clock transitions, which is more reliable than a single clock transition. According to the principles of the present invention, the two data clocks also improve noise immunity because the printer interface delays latching the data for a predetermined delay after the data clocks have both made a transition from a first logic level to a second logic level. The delay prevents the printer from responding to glitches that may occur due to cross-talk.

The CLOCK and ~CLOCK signals are transferred along with each nibble of printer data so that the effect of the propagation delay on the interface cable 28 is negated. The CLOCK and ~CLOCK signals are part of each transferred byte of data, therefore, the CLOCK and ~CLOCK signals arrive at the printer interface 102 at the same time. These features have the advantage that the host computer 16 can transmit data at approximately twice the rate of prior art systems without any loss in performance due to cross-talk or noise.

As seen from Table 1 and discussed above, a byte of printer data is broken into two separate nibbles of printer data within the host computer 16, each requiring an I/O operation by the host computer 16. Unlike the prior art data transfers, which use five I/O operations to transfer a byte of data to the printer 10, the present invention requires only two I/O operations to transfer a byte of data to the printer. In the example above, where the I/O transfer cycle was assumed to be 1.0 megabytes/second, the transfer rate for the present invention is 500 Kbytes/second. It is obvious to those of ordinary skill in the art that the ordering of the data bits in Table 1 should not be considered a limitation of the present invention. Obviously, the CLOCK and ~CLOCK could be any two data bits. Similarly, the Parity bit, the RLE flag bit, and the Data bits could be designated in any convenient manner or order other than the example illustrated in Table 1.

While the system 100 uses an ISA standard I/O interface 14 in the host computer 16, the printer interface 102, shown in FIGS. 4A and 4B, is not currently available in conventional printers and must be added. The additional hardware may be added to the printer 10 as an add-on board within the printer 10 or in a small external box or cartridge.

The printer 10 may include a plurality of internal registers (not shown) to select control parameters, such as margins, for the printer 10. The internal registers may be part of a printer memory (not shown) located within the printer 10. The system 100 includes the capability of addressing the internal registers in the printer 10. The CPU 22 first selects a desired internal register in one I/O operation, and then sends data to the selected internal register in a second I/O operation. Among the standard control lines in the I/O interface 14 (see FIG. 4A) is an AutoFd control line. If the AutoFd control line is driven low by the host computer 16, the host computer can address the internal registers in the printer 10. When addressing specific registers within the printer 10, the system 100 drives the AutoFd control line low and the data bit, D7, high. The data bits D6 to D0 are set to any desired register address between 0 and 127. Register 0 is selected for data burst mode transfer, as will be discussed below. The host computer 16 sends the data byte (with D7 set high and D6 to D0 set to the desired register address) to the printer 10 using the normal data transfer techniques well known in the prior art. This first I/O operation selects the desired internal register. The host computer 16 may send data to the selected register in the second I/O operation by driving the AutoFd control line high and setting the data bits, D7 to D0, to the desired data value. The data bits, D7 to D0, are sent to the selected register using the normal data transfer techniques well known in the prior art. The data types, such as address data, and burst data, are described in Table 2 below.

TABLE 2

| Current Register Address | Data Types | | |
|---|---|---|---|
| | D7 | nAutoFd | D<6:0> |
| Don't Care | 0 | 0 | Reserved. |
| Don't Care | 1 | 0 | Channel Address (0–127) |
| Not Zero | Data<7> | 1 | Data<6:0> |
| Zero | Burst Data<7> | 1 | Burst Data<6:0> |

To initiate a data burst mode transfer, the system 100 selects register 0 within the printer 10 in the manner described above. The selection of register 0 indicates to the printer that a burst of data will be transferred. In one embodiment, the printer 10 automatically addresses register 0 after completing the negotiation phase shown in FIG. 3. In the data burst mode, the data bits, D7 to D0, are transmitted to the printer 10 using the inventive techniques described herein.

In the present embodiment, the system 100 operates in the data burst mode in which a 4 Kbyte block of data is transferred from the host computer 16 to the printer 10. Once a data burst mode transfer is initiated, it cannot be stopped. The size of the data burst should not be considered a limitation in the invention. The typical printer buffer 116 has a buffer size of 64 Kbytes or more, so that data can be easily transferred in 4 Kbyte bursts. However, data bursts of other sizes may be used equally well with the system 100.

A handshake is issued between bursts to provide control over the flow of data from the host computer 16 to the printer 10. The presently preferred embodiment uses the IEEE P1284 ECP mode handshaking. The printer 10 may use the time between data bursts to stall or delay the transfer of the next burst of data until there is room in the printer buffer 116 for another 4 Kbyte burst of data. For each burst of data transferred to the printer 10, the following sequence occurs:

1. The data lines, D7 to D0 are driven high by the host computer 16;
2. The AutoFd control line is driven high by the host computer 16;
3. The STROBE line is driven low by the host computer 16;
4. When the printer 10 has room in the printer buffer 116 to accept a burst of data, the printer 10 sets the BUSY line high;
5. The 4 Kbyte data burst is sent; and
6. The STROBE line is driven high by the host computer 16.

Note that register 0 within the printer 10 must have been previously selected. However, register 0 does not have to be re-selected for each burst of data. The handshaking sequence described above is well known in the art and is defined in the IEEE P1284 standard. However, the IEEE P1284 standard does not include the provision of sending a data burst in between the handshaking steps 4 and 6 above. The system 100 uses the standard handshaking to simplify the incorporation of the present invention into an existing host computer 16 and printer 10.

Figure 5:
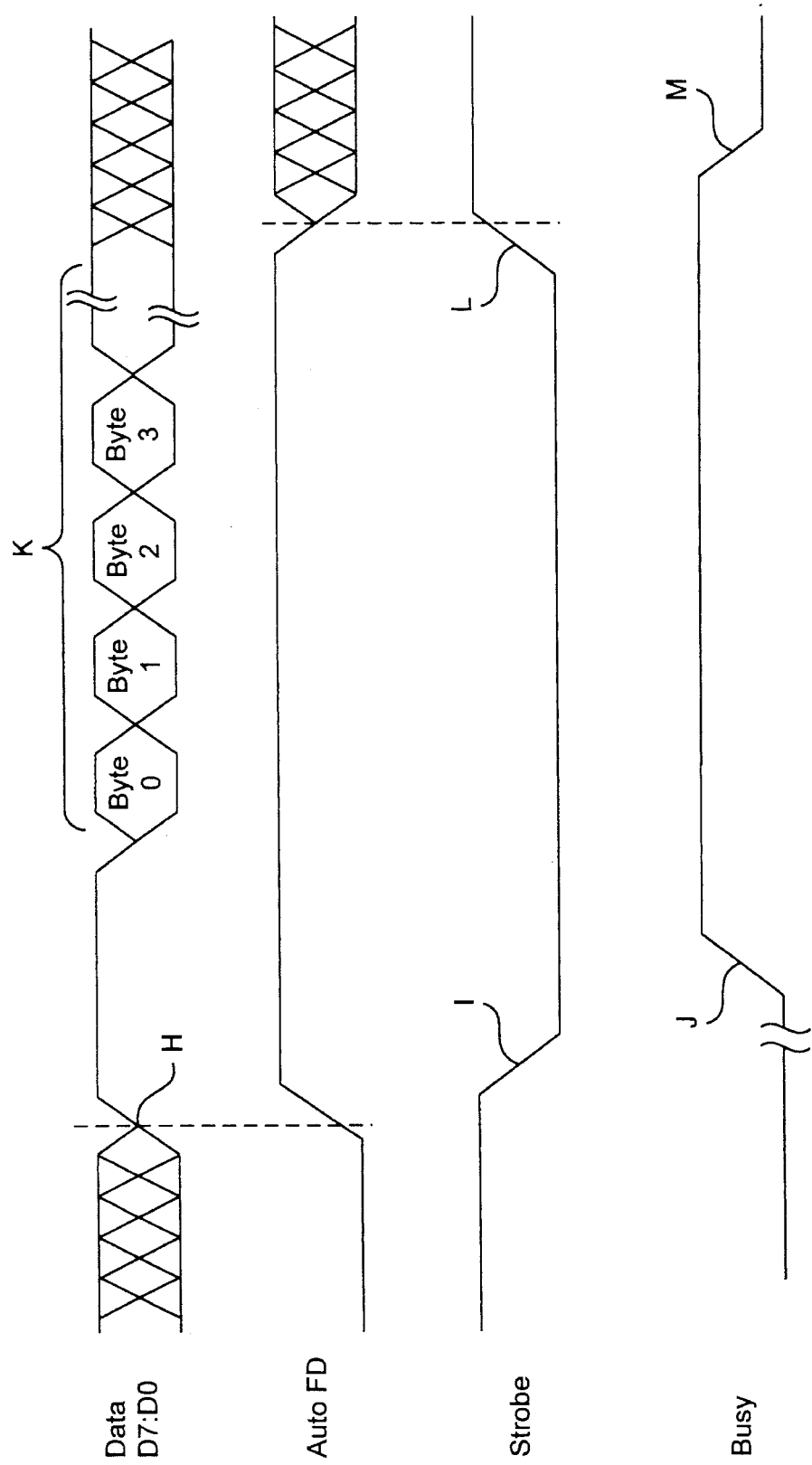
FIG. 5 is a timing diagram of data I/O transfer by the inventive system of FIG. 4A.

The data burst transfer handshaking is illustrated in the waveform diagram of FIG. 5. In preparation for a 4 Kbyte data burst, register 0 is selected to indicate to the printer 10 that a data burst mode transfer will occur. The host computer 16 then drives the data lines, D7 to D0 and the AutoFd control line high, as indicated by the reference letter H. After the data lines, D7 to D0 and the AutoFd control line have been set high the host computer 16 drives the STROBE line low, as indicated by the reference letter I. This indicates to the printer 10 that the host computer 16 is prepared to send a burst of data. When the printer 10 has enough room in the printer buffer 116 to accept a 4 Kbyte burst of data, the printer 10 sets the BUSY line high, as indicated by the reference letter J. Note that there is a variable length of time between the host computer 16 driving the STROBE line low and the printer 10 setting the BUSY line high. This time period depends on many factors such as the size of the printer buffer 116, the size of the data burst, the computing power of the printer 10, and the like. When the printer 10 has driven the BUSY line high, the 4 Kbyte burst of data may now be transferred from the host computer 16 to the printer 10, as indicated by the reference letter K. Following the transfer of all data bytes in the data burst, the host computer drives the STROBE line high, as indicated by the reference letter L, to indicate that the transfer is complete. In response to the change in the STROBE line, the printer 10 drives the BUSY line low, as indicated by the reference letter M, to indicate that the data burst has been received. The same handshaking sequence is repeated for each burst of data, however, no handshaking occurs for each byte of data, as is the case with prior art systems. Thus, the system 100 can transfer a large block of data with only a few handshaking steps between the host computer 16 and the printer 10.

As discussed above, the data clocks CLOCK and –CLOCK, are transmitted to the printer interface 102 along with the data transferred in each of the two I/O operations illustrated in Table 1. The two data clocks are simply inverted versions of each other. In one embodiment, the data bits D7 and D6 are used for CLOCK and ~CLOCK, respectively. The data bits D7 and D6 are the two most significant bits in each transferred byte of data (see Table 1). These bits are outputs from the input buffer register 104 (see FIG. 4B). In an alternative embodiment, no input buffer register 104 is used, and the transferred bytes of data from the host computer 16 are coupled directly to other circuit components in the printer interface 102.

Figure 6:
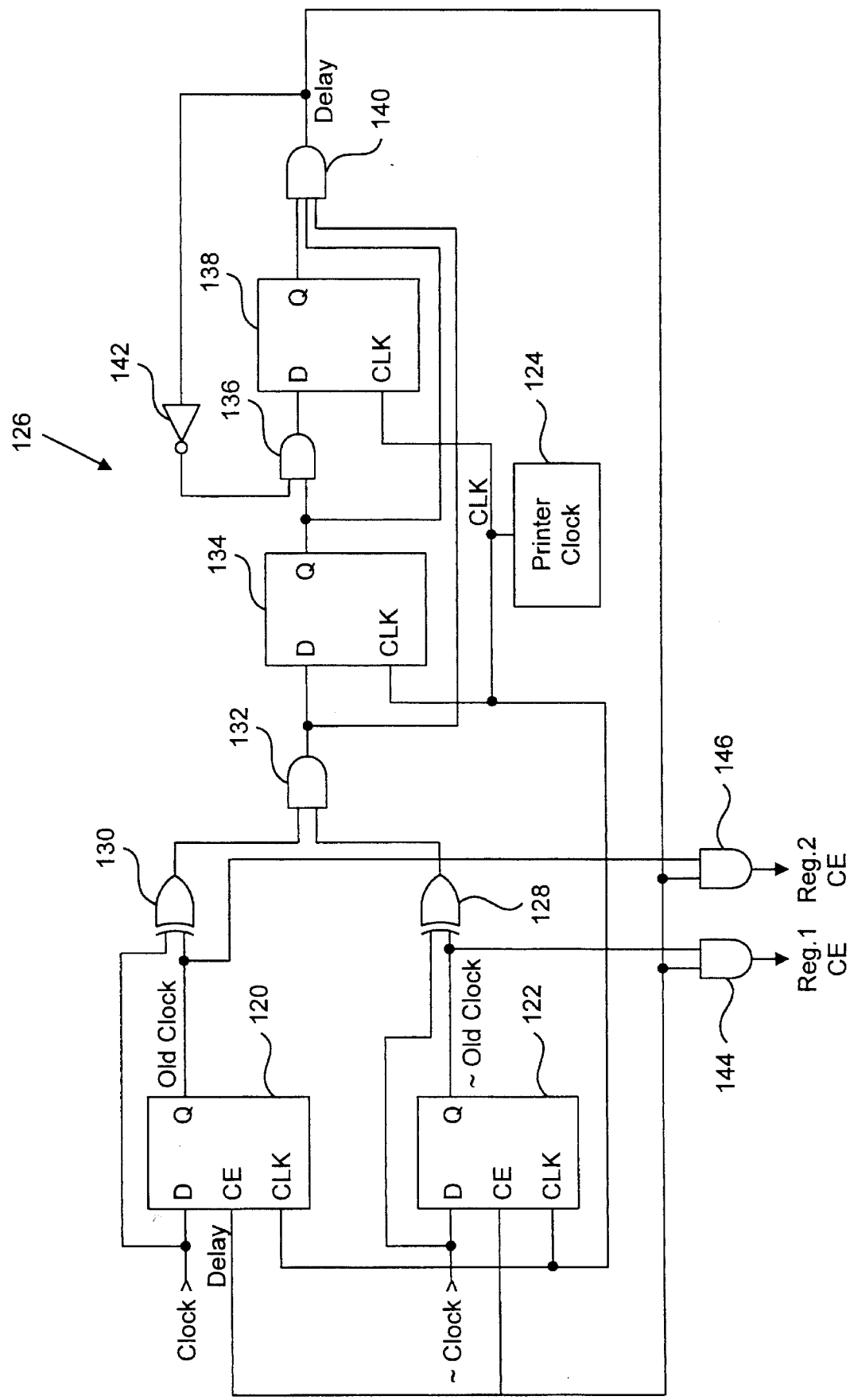
FIG. 6 is a functional block diagram of the clock circuit of the embodiment of FIG. 4B.

The details of the clock circuit 108 are shown in FIG. 6. A printer clock 124 within the printer 10 provides a high frequency clock for the clock circuit 108. The output of the printer clock 124, designated in FIG. 6 as CLK, may typically operate at approximately 20 Megahertz, with a resulting period of approximately 50 nanoseconds. Note that it is not necessary that the printer clock 124 be derived from the printer 10 for purposes of synchronization. Any clock of sufficient frequency will work with the present invention. A clock added to the printer interface 102 will work satisfactorily with the present invention.

A clock delay circuit 126, which has the CLOCK and ~CLOCK signals as inputs, is used to produce a delay, as discussed above, so that the printer interface 102 does not respond to glitches or cross-talk on the interface cable 28. The output of the clock delay circuit 126, designated as DELAY in FIG. 6, is coupled to various points throughout the clock circuit 108. Details of the clock delay circuit 126 are provided below.

Within the clock circuit 108, first and second clock registers 120 and 122 have data inputs coupled to CLOCK and ~CLOCK, respectively. The clock registers 120 and 122 have a clock input coupled to the printer clock 124. The clock registers 120 and 122 also have chip enable inputs, designated in FIG. 6 as CE. The chip enable inputs, CE, are coupled to DELAY, the output of the clock delay circuit 126. The outputs, OLD CLOCK and ~OLD CLOCK, of the clock registers 120 and 122 are used to enable the first storage register 112 and the second storage register 114.

The DELAY signal is derived by the clock delay circuit 126 in which CLOCK and ~CLOCK, are inputs to a pair of exclusive-OR gates 128 and 130, respectively. The other input to the exclusive-OR gate 128 is OLD CLOCK, the output of the first clock register 120. Similarly, the other input to the exclusive-OR gate 130 is ~OLD CLOCK, the output of the second clock register 122. The outputs of the exclusive-OR gates 128 and 130 are inputs to an AND gate 132. The output of the AND gate 132 will be high only when both CLOCK and ~CLOCK have made a transition in logic states from the OLD CLOCK and ~OLD CLOCK outputs of the clock registers 120 and 122. Thus, the printer interface 102 will not begin the delay period until both CLOCK and ~CLOCK have made a logic transition.

The output of AND gate 132 is coupled to the data input of a first delay register 134, whose clock input is CLK from the printer clock 124. When the output of AND gate 132 is high, the next pulse from the printer clock 124 will cause the output of the delay register 134 to go high. The output of the first delay register 134 is coupled to an input to an AND gate 136. The signal, DELAY, from the clock delay circuit 126 is coupled through an inverter 142 to the other input of the AND gate 136. Assuming that the signal, DELAY, is low, both inputs to the AND gate 136 will be high, causing the output of the AND gate 136 to go high. The output of the AND gate 136 is coupled to the data input of a second delay register 138. The clock input to the second delay register 138 is CLK from the printer clock 124. Because of the logic arrangement previously described, the output of the second delay register 138 will go high exactly one clock pulse after the first delay register 134 goes high. The output of the second delay register 138 is coupled to the input of a three input AND gate 140. The other two inputs to the AND gate 140 are the output from AND gate 132 and the output of the first delay register 134. The output of the AND gate 140 is the signal DELAY. Because of the feedback of the inverted version of the signal, DELAY, through the AND gate 136, the data input to the second delay register 138 goes low when the output signal, DELAY, goes high. Thus, on the following pulse from the printer clock 124, the output of the second delay register 138, and the output signal, DELAY, will return low.

The clock delay circuit 126 has good noise immunity because it takes several clock cycles of the printer clock 124 to produce the DELAY output signal. Signals such as CLOCK and ~CLOCK must remain stable throughout the several clock cycles of the printer clock 124. The DELAY signal has reduced susceptibility to noise or cross-talk on the interface cable 28 (see FIG. 4B) because transients will not remain stable for the several clock cycles and thus will be ignored by the printer interface 102. The above description of the clock delay circuit 126 is provided as an example of one circuit to produce a delayed output signal after the transition of the two clock signals, CLOCK and ~CLOCK. It is obvious to those of skill in the art that numerous such delay circuits may be employed with satisfactory results. For example, a monostable multivibrator may be used to introduce a delay to the printer interface 102.

When the DELAY signal is produced, the Low Nibble of printer data, Data<3:0>, or the High Nibble of printer data, Data<7:4> (see Table 1) is loaded into the first or second storage registers 112 and 114, respectively, depending on the polarity of CLOCK and ~CLOCK. As shown in Table 1, CLOCK is set high (and ~CLOCK is set low) for the transfer of Byte0, while CLOCK is set low (and ~CLOCK is set high) for the transfer of Byte 1. There are numerous well known techniques for enabling the first and second storage registers based on the logic levels of CLOCK and ~CLOCK. Once such technique, shown in FIG. 6, uses AND gate 144 with ~OLD CLOCK and the DELAY signal as inputs. When ~OLD CLOCK and the DELAY signal are both high, the chip enable, CE, of the first storage register 112 is enabled. The Low Nibble of data, Data<3:0> (see Table 1), is loaded into the storage register 112 with the next pulse from the printer clock 124. When Byte0 is transferred to the printer interface 102, the logic levels of OLD CLOCK and ~OLD CLOCK will be reversed. Another AND gate 146 is used to enable the second storage register 114. The inputs to the AND gate 146 are OLD CLOCK and the DELAY signal. Since the logic levels of OLD CLOCK and ~OLD CLOCK have reversed, as described above, the chip enable, CE, of the second storage register 114 will be enabled when both OLD CLOCK and DELAY are high. The High Nibble of data, Data<7:4> (see Table 1), is loaded into the second storage register 114 with the next pulse from the printer clock 124. As stated above, there are numerous other techniques that may be used satisfactorily with the system 100.

A parity bit is also transmitted from the host computer 16 to the printer 10 with each of the two I/O operations. The use of parity bits to detect transmission errors is well known and will not be discussed in detail. In the presently preferred embodiment, odd parity is used. With odd parity, the logic level of the parity bit is selected in order to make the data byte have an odd number of bits with a high logic level. As is well known in the art, a parity bit can be odd or even, and the selection of an odd parity bit should not be considered a limitation on the present invention. Processing parity errors is well known and will not be discussed herein.

As previously indicated, the first byte of data transmitted to the printer 10 also includes data compression information. The present invention uses "Run Length Encoding" (RLE) data compression to enhance the speed of data transfer from the host computer 16 to the printer 10. This well known form of data compression is used only when data characters are repeated. If a particular character is repeated a number of times, the RLE encoding transfers RLE data indicating the number of times that the following byte of printer data is to be repeated. If an RLE count is transferred to the printer 10, the system 100 sets the RLE flag high in Byte0, to indicate to the printer that printer data being transferred is an RLE count. If the data transferred in Byte0 and Byte 1 is an RLE count, the MSB of the data is set low thus indicating to the printer 10 that the data within the Low Nibble and the High Nibble is an RLE count. The remaining seven bits within the Low Nibble and the High Nibble represent the RLE count. Therefore, the maximum RLE count is 128 (ranging from 0 to 127). An RLE count of 0 indicates that the character should be repeated one time. An RLE count of 127 indicates that the character should be repeated 128 times. For example, if a particular "character" such as a horizontal line is repeated 25 times to form the boundary of a table, the system 100 would transfer the RLE count of 24 for this example to the printer 10 (in two nibbles, as described above) followed by the data representing the character itself, again in two nibbles. Thus, 25 characters of data are transferred using only four I/O operations.

As a further improvement, a second embodiment of the system 100 can include only a single clock transmitted along with printer data bytes in the burst mode instead of the two clock signals discussed in the first embodiment. Because of the different transition rates for typical driver integrated circuits within the printer 10, as discussed above, the printer interface 102 must wait a predetermined period of time to assure that the printer data bytes have reached a steady state. This is accomplished by adding an internal delay period in the printer 10 between detecting the clock transition and reading the transmitted data. The internal delay used in the second embodiment overcomes the problems associated with the different transitions rates in the printer driver circuits, as well as the propagation delays and noise problems previously discussed.

Once the system 100 is in the forward phase 52 (see FIG. 3), the second embodiment uses the burst mode and handshaking between bursts, as discussed above in connection with the first embodiment in which two clock signals are transmitted with each transmitted data byte. However, the use of the single clock in the output data bytes of the second embodiment permits a different byte packing arrangement that yields an increase in the data transfer rate. As with the previously described embodiment, a burst of data is transmitted from the host computer 16 to the printer 10 in the second embodiment. However, instead of two transmitted bytes containing a single byte of printer data, the second embodiment sequentially transmits four bytes of data (Byte0, Byte1, Byte2, and Byte3) containing three bytes of printer data (DataByteA, DataByteB, and DataByteC). In addition to the three bytes of printer data (DataByteA, DataByteB, and DataByteC), the four output data bytes (Byte0, Byte1, Byte2, and Byte3) also contain clock signals, parity bits, and a flag to indicate the presence of an RLE count. The data format used by the second embodiment is shown below in Table 3.

TABLE 3

| | Burst-Mode Data Format | | | |
|---|---|---|---|---|
| Parallel Port Data | Value During Byte 0 Transfer | Value During Byte 1 Transfer | Value During Byte 2 Transfer | Value During Byte 3 Transfer |
| D7 | 0 | 1 | 0 | 1 |
| D6 | RL Flag | Parity | Parity | Parity |
| D5 | DataByteA<5> | DataByteB<3> | DataByteC<1> | DataByteC<7> |
| D4 | DataByteA<4> | DataByteB<2> | DataByteC<0> | DataByteC<6> |
| D3 | DataByteA<3> | DataByteB<1> | DataByteB<7> | DataByteC<5> |
| D2 | DataByteA<2> | DataByteB<0> | DataByteB<6> | DataByteC<4> |
| D1 | DataByteA<1> | DataByteA<7> | DataByteB<5> | DataByteC<3> |
| D0 | DataByteA<0> | DataByteA<6> | DataByteB<4> | DataByteC<2> |

As seen in Table 3, the three bytes of printer data, designated in Table 3 as DataByteA to DataByteC, are divided so that each byte of transmitted data contains six bits of printer data. For example, Byte0 contains six data bits, DataByteA<5:0>, of the first printer data byte, DataByteA. The next output data byte, Byte1, contains the remaining bits, DataByteA<7:6>, of the first printer data byte, DataByteA, as well as the first four bits, DataByteB<3:0>, of the second printer data byte, DataByteB. Thus, the three printer data bytes, DataByteA, DataByteB, and DataByteC, are all transmitted within the four output data bytes, Byte0, Byte1, Byte2, and Byte3. The more efficient packing of data bytes used by the second embodiment, permits even greater transfer rates than the first embodiment, and far greater transfer rates than the standard printer interface. Assuming the 1.0 megabytes/second I/O transfer cycle discussed above, the second embodiment permits a data transfer rate of 750 Kbytes/second. This is the data transfer rate only, and does not include processing time to pack and unpack the printer data bytes.

One data bit, D7, in each output data byte is used as a clock signal for the printer 10. The printer 10 detects each transition of D7 and triggers the internal delay timer within the printer 10. At the end of the delay period, the remaining data bits are read by the printer 10.

The second embodiment also includes RLE compression. As discussed above, RLE compression includes a data byte that indicates the number of times that the next data byte is to be repeated. In the second embodiment, a single data bit, DataByteA<6>, in the first output data byte, Byte0, is a flag that indicates the presence of RLE data. The first printer data byte, DataByteA<7:0> contains the RLE count, and the next printer data byte, DataByteB<7:0> contains the actual byte of printer data to be repeated. The previously described embodiment limited the maximum RLE count to 127 because of the arrangement of the data bits shown in Table 1. Because the second embodiment has more data bits available, the maximum RLE count is 255, indicating that the following byte of printer data is to be repeated 256 times. The third printer data byte, DataByteC<7:0>, cannot contain another RLE count in the second embodiment because DataByteC<6> is used for parity. Therefore, the third printer data byte, DataByteC<7:0>, is used as a normal byte of printer data.

The second embodiment also includes a parity bit in three of the four output data bytes, Byte0 to Byte3. While DataByteC<6> is used as an RLE flag in the first output data byte, Byte0, the same data bit is used as a parity bit for each of the next three output data bytes, Byte 1 to Byte3. That is, DataByteB<6>, DataByteC<6>, and DataByteD<6> are all parity bits for their respective output data bytes, Byte 1 to Byte3. In the second, embodiment, odd parity is used as discussed above. The use of parity bits is well known in the art and will not be discussed in detail herein. The first printer data byte, DataByteA<7:0>, does not contain a parity bit.

Figure 7:
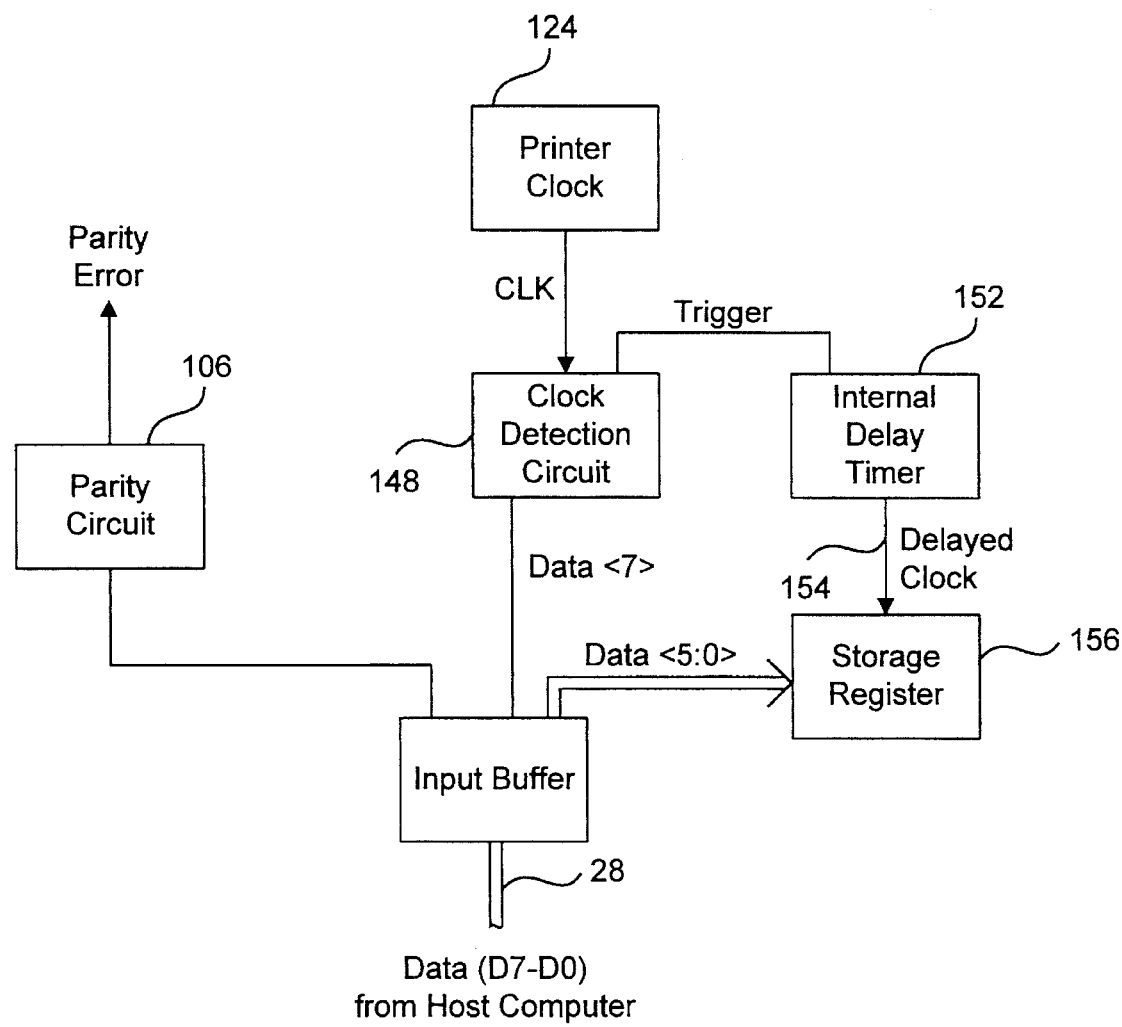
FIG. 7 is a functional block diagram of a second embodiment of the inventive system of FIG. 4A.

A functional block diagram of the second embodiment of the printer interface 102 is shown in FIG. 7. As with the previously described embodiment, the input buffer register 104 receives the transmitted bytes of data from the host computer 16 and temporarily stores the received data bytes. The parity circuit 106 detects parity errors in any of the last three output data bytes, Byte 1 to Byte 3. The operation of parity error detection circuits is well known in the art and will not be discussed herein.

A clock detection circuit 148 detects transitions of the data line, D7. The clock detection circuit 148 detects both low to high transitions and high to low transitions. The clock detection circuit 148 operates at a much higher speed than the data transfer rate and will thus be able to detect each transition of the data line, Data7. In the second embodiment, the printer clock 124 has a period of 50 nanoseconds. The data line, D7, is sampled by the clock detection circuit 148 several times to assure that the first detected transition is not just noise. The clock delay circuit 126 (see FIG. 6) can be used in the clock detection circuit 148 to provide the required sampling to prevent noise from causing the system 100 to inadvertently read data.

Figure 8:
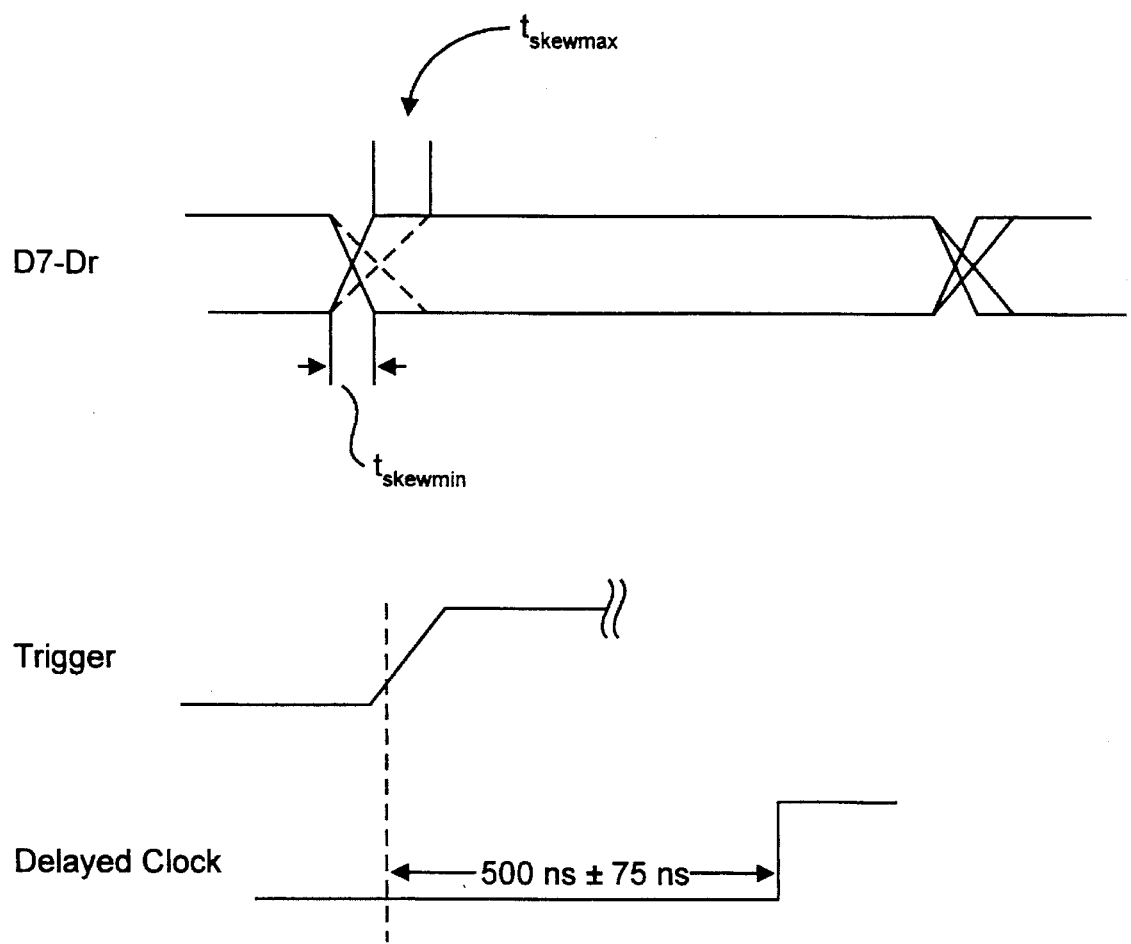
FIG. 8 is a waveform timing diagram of the embodiment of FIG. 7.

The output of the clock detection circuit 148 triggers the start of an internal delay timer 152. The internal delay timer 152 is set to compensate for the maximum transition time in the printer driver circuit. As seen in the waveform of FIG. 8, the data lines, D7 to D0, in the input buffer register 104 (see FIG. 7) have a transition time designated as $t_{skew}$. While the transition time may vary from one particular integrated circuit to another, and the rise time is different from the fall time, as previously discussed, the maximum value for $t_{skew}$ is 300 nanoseconds. The internal delay timer 152 is set for a period between 425 nanoseconds and 575 nanoseconds, and generates a delayed clock signal 154 that enables a storage register 156. The storage register may be the printer buffer 116 (see FIG. 4B). Thus, the data from the input buffer register 104 is not latched into the storage register 156 until well after the data has reached a stable value.

The printer interface 102 can unpack the three printer data bytes as they are received and store only the unpacked printer data bytes in the storage register 156. The printer interface 102 may use the time during which the delay timer is active to unpack the previously received printer data bytes. Alternatively, the printer data bytes may be loaded into the storage register 156 in the packed data format described above and unpacked at a later time such as when the host computer 16 has completed transmitting the data burst.

The data may be transferred from the host computer memory 24 (see FIG. 4B) using a number of well known commands. For example, a string repeat command is available on X86-based computers (i.e., 80286, 80386, 80486) that takes the data from the memory 24 and quickly transfers it to the I/O interface 14. It is possible that some computers, such as those with a microchannel bus, can transfer data to the I/O interface 14 faster than the printer interface 102 can accept the data. In this situation, a simple software delay loop within the host computer 16 can be used to slow the data transfer rate down to rates that can be processed by the printer interface 102.

Figure 9A:
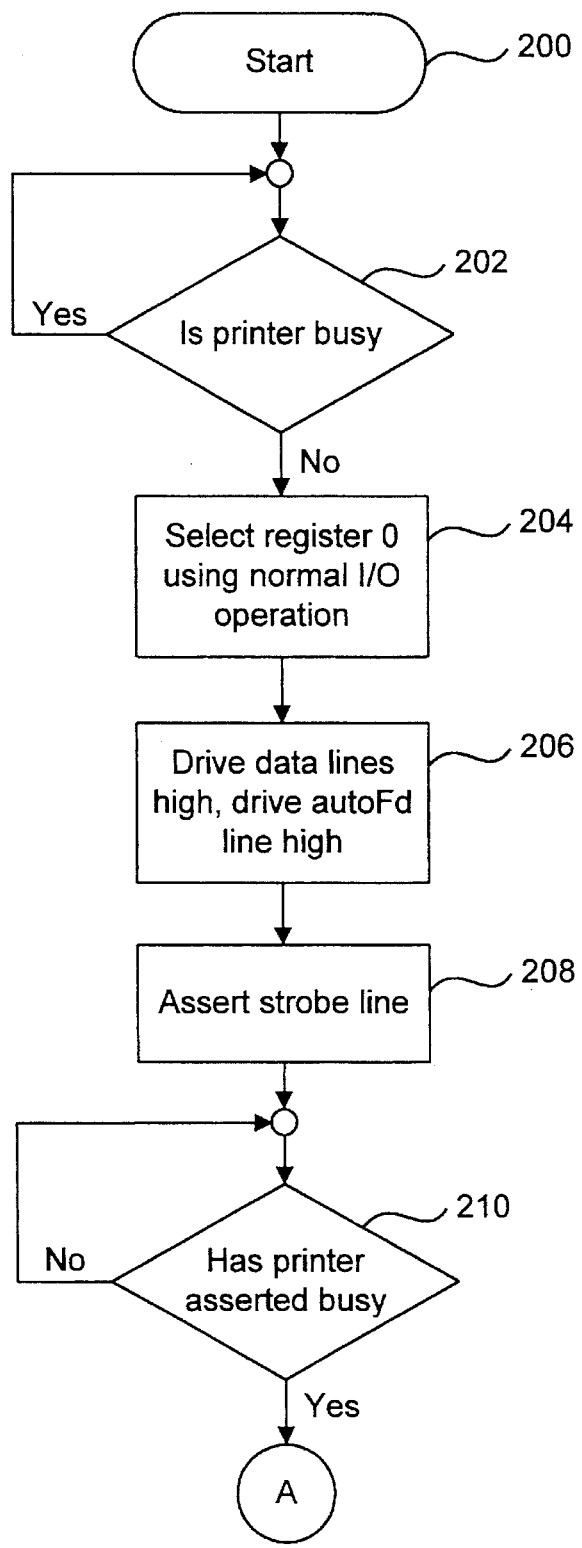
FIGS. 9A and 9B are flow charts illustrating the method of use of the inventive system of FIG. 4A.
Figure 9B:
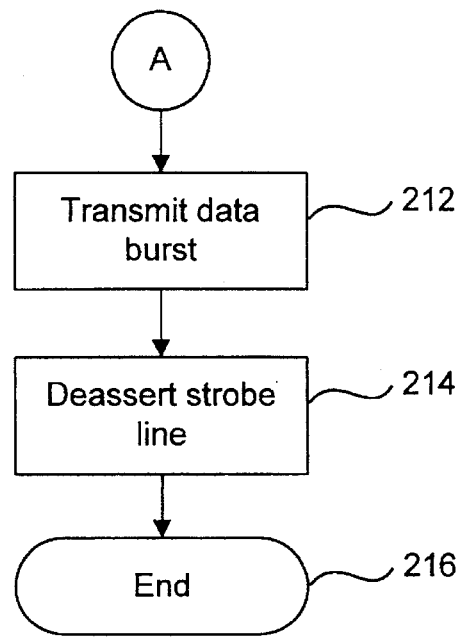

The inventive method is easily implemented on any computer. The flow charts of FIGS. 9A and 9B illustrate the method implemented by the system 100. The process of transferring data starts at 200 in FIG. 9A. In decision block 202, the I/O interface 14 (see FIG. 4B) checks the status of the printer 10 to determine if the printer can accept a data burst. If the printer 10 cannot accept data, the result of decision block 202 is YES, and the system 100 loops back until the printer is not busy. If the printer 10 is not busy, the result of decision block 202 is NO. In that case, the host computer 16, in step 204, selects internal register 0 in the printer 10 using the normal I/O operation as discussed above. The transfer of the address in step 204 occurs in the same manner as a prior art data transfer would occur. That is, the host computer 16 waits until the printer 10 is not busy and transfers a byte of data rather than breaking the byte of printer data into portions. Selecting internal register 0 indicates to the printer 10 that the host computer 16 is transmitting a burst of data.

In step 206, the host computer 16 drives the data lines and the AutoFd control line high. In step 208, the system 100 asserts the STROBE line to indicate to the printer 10 that the host computer is ready for a data burst transfer. In decision block 210, the system 100 checks to see if the printer 10 has asserted the BUSY line, indicating that the printer can accept a data burst. If the printer 10 has not asserted the BUSY line, the result of decision 210 is NO, and the system loops back to continue checking. If the printer 10 has asserted the BUSY line, the result of decision 210 is YES. In that case, the system 100 transmits the data burst in step 212, shown in FIG. 9B, without using any additional handshaking. The printer interface 102 (see FIG. 4A) processes the output data bytes as discussed above. Following the transmission of the data burst, the host computer 16 deasserts the STROBE line in step 214 to complete the process of transmitting a burst of data to the printer 10.

The method described with respect to FIGS. 9A and 9B continues for each 4 Kbyte burst of data transferred from the host computer 16 to the printer 10. Thus, the speed of data transfer has been increased while maintaining or improving reliability of data transfer.

Those skilled in the art will appreciate that many different hardware configurations can be used to practice the invention. The system 100 works with almost any computer and does not require any special hardware within the host computer 16. A small circuit board containing the printer interface 102 can be added to the printer 10 to implement the system 100.

The second embodiment described above illustrates one byte packing scheme that can be used to transfer data from the host computer 16 to the printer 10. It is obvious to those skilled in the art that other byte packing schemes could be used to transfer data and clock signals in a burst mode. While the above description illustrates a system for improving data transfer between the host computer 16 and the printer 10, it is obvious that the inventive system and method can be used with peripherals other than printers. For example, a facsimile machine could be attached to the host computer 16 instead of the printer 10. Thus, the system 100 can increase the rate of data transfer to any peripheral.

It is to be understood that, even though various embodiments and advantages have been set forth in the foregoing description, the above disclosure is illustrative only, and changes may be made in detail and yet remain within the broad principles of the present invention. Therefore, the present invention is to be limited only by the appended claims.

I claim:

1. A system fix transferring data between a computer and a printer using a printer cable having data lines and a control line, the system comprising:

an output interface on the host computer to generate in sequence a plurality of output data bytes, each of said output data bytes containing a portion of one byte of a plurality of bytes of printer data, and at least one data bit set to a predetermined level indicative of an order in which said output data bytes will be transferred to the printer, said output interface transferring said output data bytes to the printer over the printer cable data lines;

an input buffer within the printer to receive said output data bytes from said output interface;

a parity error checker, coupled to said input buffer, to analyze at least one of said received output data bytes and generate a parity error signal if a parity error occurred within said one received output data byte;

a clock detection circuit within the printer to detect said predetermined data bit level indicative of said transfer order in each of said received output data bytes and generate a detected clock signal;

a delay timer within the printer operatively receiving said detected clock signal and generating a delayed clock signal having a predetermined delay with respect to said detected clock signal; and a storage register, coupled to said input buffer and enabled by said delayed clock signal, to store said printer data byte portions received as a part of said received output data bytes, whereby said printer data byte portions are transmitted from the computer to the printer and can be reformed as said plurality of bytes of printer data.

2. The system of claim 1 wherein a first of said plurality of primer data bytes includes a compression data value indicating a number of times that a second of said plurality of printer data bytes is to be repeated.

3. The system of claim 2 wherein a portion of one of said output data bytes indicates the presence of compressed data.

4. A system for transferring data between a computer and a peripheral, the system comprising:

an output interface on the computer to generate a plurality of output data bytes, each of said plurality of output data bytes containing a portion of a plurality of peripheral data bytes and at least one data bit set to a predetermined level indicative of an order in which said output data bytes will be transferred to the peripheral, said output interface transferring said output data bytes to the peripheral;

a clock detection circuit within the peripheral to detect said order data bit in each of said output data bytes received from the computer and generate a detected clock signal in response thereto;

a delay timer within the peripheral operatively receiving said detected clock signal and generating a delayed clock signal having a predetermined delay with respect to said detected clock signal; and a storage register enabled by said delayed clock signal, to store said portion of said received peripheral data bytes received as a part of said received output data bytes, whereby said portion of peripheral data bytes are transmitted from the computer to the peripheral as part of said output data bytes and can be reformed as said plurality of peripheral data bytes.

5. The system of claim 4, further including an input buffer within the peripheral to receive and temporarily store said output data bytes for supply to said clock detection circuit and said storage register.

6. The system of claim 5, further including a parity error checker coupled to said input buffer to analyze at least one of said output data bytes and generate a parity error signal if a parity error occurred within said one output data byte.

7. The system of claim 4 wherein a first of said plurality of peripheral data bytes includes a compression data value indicating a number of times that a second of said plurality of peripheral data bytes is to be repeated.

8. The system of claim 4 wherein a portion of one of said output data bytes indicates the presence of compressed data.

9. A system for transferring data between a computer and a peripheral, the computer containing an output interface to generate a plurality of output data bytes, each of said output data bytes containing a portion of a plurality of peripheral data bytes and at least one data bit set to a predetermined level indicative of an order in which the output data bytes will be transferred to the peripheral, the output interface transferring the output data bytes to the peripheral, the system comprising:

a clock detection circuit within the peripheral to detect the order data bit in each of the output data bytes received from the computer and generate a detected clock signal in response thereto;

a delay timer within the peripheral operatively receiving said detected clock signal and generating a delayed clock signal having a predetermined delay with respect to said detected clock signal; and a storage register enabled by said delayed clock signal, to store the received portions of peripheral data bytes received as a part of the received output data bytes, whereby the portions of peripheral data bytes are transmitted from the computer to the peripheral and can be reformed as the plurality of peripheral data bytes.

10. The system of claim 9, further including an input buffer within the peripheral to receive and temporarily store the output data bytes for supply to said clock detection circuit and said storage register.

11. The system of claim 10, further including a parity error checker coupled to the input buffer to analyze at least one of said output data bytes and generate a parity error signal if a parity error occurred within said one output data byte.

12. The system of claim 9 wherein a first of the peripheral data bytes includes a compression data value indicating a number of times that a second of the plurality of peripheral data bytes is to be repeated.

13. The system of claim 9 wherein a portion of one of the output data bytes indicates the presence of compressed data.

14. A system for transferring data between a computer and a peripheral using a peripheral cable having data lines, the peripheral containing a clock detection circuit to detect from each of a plurality of output data bytes received from the computer at least one data bit set to a predetermined level indicative of an order in which the output data bytes will be transferred to the peripheral and generate a detected clock signal, and a storage register to store a portion of a plurality of peripheral data bytes received as a part of the received output data bytes, the system comprising:

a data file containing the plurality of bytes of peripheral data; and an output interface on the computer to generate the output data bytes, each of said generated output data bytes containing the portion of a plurality of peripheral data bytes and the at least one data bit set to the predetermined level, said output interface transferring said generated output data bytes to the peripheral on the peripheral cable data lines, whereby the portions of peripheral data bytes are transmitted from the computer to the peripheral and can be reformed as the plurality of peripheral data bytes.

15. The system of claim 14 wherein said output interface determines a parity value for at least one of said generated output data bytes and determines a logic level for a parity bit based on said determined parity value, whereby the printer can detect parity errors in said at least one plurality of generated output data byte.

16. The system of claim 14 wherein a first of said plurality of peripheral data bytes includes a compression data value indicating a number of times that a second of said plurality of peripheral data bytes is to be repeated.

17. The system of claim 14 wherein a portion of one of said output data bytes indicates the presence of compressed data.

18. A method for transferring data between a computer and a peripheral coupled to the computer, the method comprising the steps of:

generating a plurality of output data bytes within the computer, each of said output data bytes containing a portion of a plurality of peripheral databytes and at least one data bit set to a predetermined level indicative of an order in which said plurality of output data bytes will be transferred to the peripheral;

transferring said output data bytes to the peripheral;

within the peripheral, detecting said order data bit level from each of said output data bytes received from the computer and generating a detected clock signal in response thereto;

in response to the generation of said detected clock signal, generating a delayed clock signal having a predetermined delay with respect to said detected clock signal; and reforming said portions of peripheral data bytes into said plurality of peripheral data bytes.

19. The method of claim 18, further including the step of temporarily storing said received output data bytes in an input buffer within the peripheral, said step of detecting said predetermined data bit level using said output data bytes stored in said input buffer.

20. The method of claim 19, further including the steps of determining a parity value for at least one of said output data bytes, setting a parity bit in said at least one of said output data bytes based on said determined parity value, analyzing said at least one of said output data bytes to detect a parity error, and generating a parity error signal if said parity error occurred within said at least one of said output data bytes.

21. The method of claim 18 wherein a first of said plurality of peripheral data bytes includes a compression data value indicating a number of times that a second of said plurality of peripheral data bytes is to be repeated, the peripheral detecting said compression data value and repeating said second peripheral data byte a number of times corresponding to said compression data value.

22. The method of claim 18 wherein a compression portion of one of said output data bytes indicates the presence of compressed data, the peripheral detecting said compression portion and processing said compressed data.

23. A method for transferring data between a computer and a peripheral using a peripheral cable having data lines and a control line, the computer containing an output interface to generate a plurality of output data bytes, each of the plurality of output data bytes containing a portion of a plurality of peripheral databytes and at least one data bit set to a predetermined level indicative of an order in which the plurality output data bytes will be transferred to the peripheral, the method comprising the steps of:

receiving in the peripheral the output data bytes to the peripheral over the peripheral cable data lines;

within the peripheral, detecting the predetermined data bit level indicative of said transfer order in each of the received output data bytes and generating a detected clock signal in response thereto;

in response to the generation of said detected clock signal, generating a delayed clock signal having a predetermined delay with respect to said detected clock signal; and reforming said portions of peripheral data bytes into the plurality of peripheral data bytes.

24. The method of claim 23, further including the step of temporarily storing the output data bytes within an input buffer in the peripheral, said step of detecting the predetermined data bit level using the output bytes stored in said input buffer.

25. The method of claim 23, further including the steps of determining a parity value for at least one of the output data bytes, setting a parity bit in said at least one of the output data bytes based on said determined parity value, analyzing said at least one of the output data bytes to detect a parity error, and generating a parity error signal if said parity error occurred within said at least one of the output data bytes.

26. The method of claim 23 wherein a first of the plurality of peripheral data bytes includes a compression data value indicating a number of times that a second of the plurality of peripheral data bytes is to be repeated, the peripheral detecting said compression data value and repeating said second peripheral data byte a number of times corresponding to said compression data value.

27. The method of claim 23 wherein a compression portion of one of the output data bytes indicates the presence of compressed data, the peripheral detecting said compression portion and processing said compressed data.

28. A method for transferring data from a computer to a peripheral using a peripheral cable having data lines, the peripheral containing a clock detection circuit to detect a signal from each of a plurality of output data bytes received from the computer and generate a detected clock signal therefrom, and a storage register to store a portion of a plurality of peripheral data bytes contained within the received output data bytes, the method comprising the steps of:

retrieving a data file containing a plurality of bytes of peripheral data; and generating the plurality of output data bytes, each of said generated output data bytes containing a portion of the plurality of peripheral data bytes and at least one data bit set to a predetermined level indicative of an order in which the plurality of generated output data bytes will be transferred to the peripheral such that the output data bytes contain both the portion of the peripheral data bytes and said at least one data bit for simultaneous transfer to the peripheral over the data lines to permit the detection of said at least one data bit by the clock detection circuit and use by the storage register for storage and reformation of the peripheral data bytes.

29. The method of claim 28, further including the steps of determining a parity value for at least one of the output data bytes, setting a parity bit in said at least one of the output data bytes based on said determined parity value, and adding said parity data bit to said at least one of the output data bytes, whereby the peripheral can detect parity errors in said at least one of the output data bytes.

30. The method of claim 28, further including the step of generating a compression data value for a first of the plurality of peripheral data bytes, said compression data value indicating a number of times that a second of the plurality of peripheral data bytes is to be repeated.

31. The method of claim 28, further including the step of adding a compression data portion to one of said generated output data bytes to indicate the presence of compressed data.

32. A system for transferring data between a computer and a peripheral, the system comprising:

an output interface on the computer to generate a plurality of output data bytes, each of said output data bytes containing a portion of a peripheral data byte and at least one data bit set to a predetermined level indicative of an order in which said output data bytes will be transferred to the peripheral, said output interface transferring said output data bytes containing said order data bit to the peripheral with said order data bit being transmitted simultaneously with each of said output data bytes;

a clock detection circuit within the peripheral to detect said order data bit in each of said output data bytes received from the computer and generate a detected clock signal in response thereto;

a delay timer within the peripheral operatively receiving said detected clock signal and generating a delayed clock signal having a predetermined delay with respect to said detected clock signal; and a storage register enabled by said delayed clock signal, to store said portion of said received peripheral data byte received as a part of said received output data bytes, whereby said order data bit and said portion of said peripheral data byte are simultaneously transmitted from the computer to the peripheral as part of said output data bytes.

33. A system for the formatting of data for transfer from a computer to a peripheral containing a storage register, the system comprising:

a storage location storing a plurality of bytes of peripheral data; and an output interface on the computer to generate a plurality of output data bytes containing a portion of said peripheral data bytes and at least one data bit set to a predetermined level indicative of an order in which said plurality of output data bytes will be transferred to the peripheral such that said output data bytes contain both said portions of peripheral data bytes and said at least one data bit for simultaneous transfer to the peripheral to permit detection of said at least one data bit by the peripheral and use thereof by the storage register for storage and reformation of the plurality of peripheral data bytes.

\* \* \* \* \*

UNITED STATES PATENT AND TRADEMARK OFFICE
CERTIFICATE OF CORRECTION

PATENT NO.   : 5,581,669
DATED        : December 3, 1996
INVENTOR     : David W. Voth It is certified that errors appear in the above identified patent and that said Letters Patent is hereby corrected as shown below:

In column 15, claim 2, line 2, following "of", please delete "primer" and insert --printer--.

In column 16, claim 12, line 1, following "the", please insert --plurality of--.

In column 17, claim 15, line 5, following "one", please delete "plurality of".

In column 17, claim 18, line 6, following "peripheral", please delete "databytes" and insert --data bytes--.

In column 18, claim 23, line 6, following "peripheral", please delete "databytes" and insert --data bytes--.

Signed and Sealed this

Fifth Day of August, 1997

Attest:

BRUCE LEHMAN

*Attesting Officer*      *Commissioner of Patents and Trademarks*